United States Patent
Zhang

(10) Patent No.: US 10,531,274 B2
(45) Date of Patent: Jan. 7, 2020

(54) DATA PROCESSING METHOD AND DEVICE

(71) Applicant: Huawei Technologies Co., Ltd., Shenzhen, Guangdong (CN)

(72) Inventor: Wei Zhang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 189 days.

(21) Appl. No.: 15/663,222

(22) Filed: Jul. 28, 2017

(65) Prior Publication Data

US 2017/0332227 A1 Nov. 16, 2017

Related U.S. Application Data

(63) Continuation of application No. PCT/CN2015/071947, filed on Jan. 30, 2015.

(51) Int. Cl.
*H04W 8/14* (2009.01)
*H04L 12/717* (2013.01)
*H04L 29/08* (2006.01)
*H04W 40/02* (2009.01)
*H04L 12/70* (2013.01)

(52) U.S. Cl.
CPC ............ *H04W 8/14* (2013.01); *H04L 45/42* (2013.01); *H04L 67/327* (2013.01); *H04L 2012/5681* (2013.01); *H04W 40/02* (2013.01)

(58) Field of Classification Search
None
See application file for complete search history.

(56) References Cited

U.S. PATENT DOCUMENTS

| 2009/0310485 A1* | 12/2009 | Averi | H04L 45/00 370/232 |
| 2012/0320920 A1* | 12/2012 | Akiyoshi | H04L 45/42 370/392 |

(Continued)

FOREIGN PATENT DOCUMENTS

| CN | 101291546 A | 10/2008 |
| CN | 101742554 A | 6/2010 |
| CN | 102487306 A | 6/2012 |

OTHER PUBLICATIONS

Open Networking Foundation; "OpenFlow Switch Specification Version 1.3.1 (Wire Protocol 0x04)"; ONF TS-007; Sep. 6, 2012; 128 pages.

*Primary Examiner* — Chi H Pham
*Assistant Examiner* — Vladislav Y Agureyev
(74) *Attorney, Agent, or Firm* — Leydig, Voit & Mayer, Ltd.

(57) ABSTRACT

Embodiments of the present disclosure provide a data processing method and a device. The method includes: determining, by a controller, a data packet filtering rule and a data forwarding path; sending, by the controller, the data packet filtering rule and configuration information carrying the data forwarding path to a first node, where the filtering rule is used to match configuration information corresponding to a data packet of the first node, the configuration information includes routing information corresponding to each node in the data forwarding path, routing information includes a queue identifier which is used to identify a transmission queue to which the data packet belongs; forwarding, by the first node and a remaining node, the data packet.

25 Claims, 7 Drawing Sheets

(56) References Cited

U.S. PATENT DOCUMENTS

| | | | |
|---|---|---|---|
| 2013/0031271 A1* | 1/2013 | Bosch | H04W 40/36 |
| | | | 709/245 |
| 2013/0223442 A1 | 8/2013 | Narayanan et al. | |
| 2013/0329601 A1 | 12/2013 | Yin et al. | |
| 2014/0098669 A1 | 4/2014 | Garg et al. | |
| 2014/0355444 A1 | 12/2014 | Turtinen et al. | |
| 2015/0023150 A1* | 1/2015 | Chen | H04L 45/50 |
| | | | 370/217 |
| 2015/0215978 A1* | 7/2015 | Casati | H04W 76/11 |
| | | | 370/329 |
| 2015/0358198 A1* | 12/2015 | Mahajan | H04L 41/082 |
| | | | 709/221 |
| 2016/0037434 A1* | 2/2016 | Gopal | H04W 40/246 |
| | | | 370/316 |
| 2016/0338051 A1* | 11/2016 | Kronander | H04W 40/00 |

\* cited by examiner

DATA PROCESSING METHOD AND DEVICE

CROSS-REFERENCE TO RELATED APPLICATIONS

This application is a continuation of International Application No. PCT/CN2015/071947, filed on Jan. 30, 2015, the disclosure of which is hereby incorporated by reference in its entirety.

TECHNICAL FIELD

Embodiments of the present disclosure relate to communications technologies, and in particular, to a data processing method and a device.

BACKGROUND

With development of communications technologies, a network has a higher requirement for a transmission rate, and an ultra dense deployment will occur in the network. In an ultra dense deployment scenario, a base station is smaller. In addition, considering networking costs of base stations, data transmission between a base station and a core network and data transmission between the base stations are increasingly in a wireless backhaul line (Backhaul) manner. However, a wireless backhaul line between the base stations needs to occupy spectrum resources of an operator, which are quite limited and precious. Use of the wireless backhaul line resources needs to be effectively managed, to improve bandwidth utilization of the wireless backhaul line.

In a prior-art solution, when a wireless backhaul line network is used for data transmission between a core network and user equipment, control signaling needs to be delivered to each node (base station) in a data transmission path by using an air interface (that is, an air interface); and data scheduling transmission can be completed based on a bearer only after each node obtains flow information corresponding to a data packet. Consequently, a large amount of control signaling needs to be sent, and bandwidth resources of an air interface are wasted.

SUMMARY

Embodiments of the present disclosure provide a data processing method and a device, so as to reduce control signaling that is sent by using an air interface, and improve bandwidth utilization of the air interface.

According to a first aspect, the embodiments of the present disclosure provide a data processing method, where the method includes:

determining, by a controller, a data forwarding path used for data packet transmission between user equipment and a core network; and sending, by the controller, a data packet filtering rule and configuration information carrying the data forwarding path to a first node in the data forwarding path, where the filtering rule is used to match configuration information corresponding to a data packet of the first node, the configuration information includes routing information corresponding to each node in the data forwarding path, routing information corresponding to any node in the data forwarding path includes a queue identifier allocated by the controller to the data packet, and the queue identifier is used to identify a transmission queue to which the data packet belongs.

With reference to the first aspect, in a first possible implementation, when the data forwarding path is used for the first time to forward the data packet or the data forwarding path changes, the routing information corresponding to the any node in the data forwarding path further includes:

an identifier of a node next to the any node and scheduling information of the transmission queue on the any node.

With reference to the first possible implementation of the first aspect, in a second possible implementation, when the any node is a last node in the data forwarding path, and the data packet is uplink data sent by the user equipment to the core network, an identifier of a node next to the last node is a bearer identifier of the core network; or when the any node is a last node in the data forwarding path, and the data packet is downlink data sent by the core network to the user equipment, an identifier of a node next to the last node is an air interface bearer identifier of the user equipment.

With reference to the first possible implementation of the first aspect, in a third possible implementation, the scheduling information of the transmission queue on the any node includes:

priority information allocated by the controller to the transmission queue on the any node; or corresponding quality of service information allocated by the controller to the transmission queue, where the any node determines priority information of the transmission queue on the any node according to the quality of service information.

According to a second aspect, the embodiments of the present disclosure provide another data processing method, where the method includes:

receiving, by a node, a data packet filtering rule and configuration information carrying a data forwarding path that are sent by a controller, where the data forwarding path represents a forwarding path used for data packet transmission between user equipment and a core network, the configuration information includes routing information corresponding to each node in the data forwarding path, routing information corresponding to any node in the data forwarding path includes a queue identifier allocated by the controller to a data packet, and the queue identifier is used to identify a transmission queue to which the data packet belongs; and receiving, by the node, the data packet from an interface connected to the core network or the user equipment, finding, according to a result of matching the data packet against the filtering rule, the configuration information corresponding to the data packet, adding the configuration information to a header of the data packet, and forwarding the data packet to a next node according to routing information corresponding to the node.

With reference to the second aspect, in a first possible implementation, when the data forwarding path is used for the first time to forward the data packet or the data forwarding path changes, the routing information corresponding to the any node in the data forwarding path further includes:

an identifier of a node next to the any node and scheduling information of the transmission queue on the any node.

With reference to the first possible implementation of the second aspect, in a second possible implementation, when the any node is a last node in the data forwarding path, and the data packet is uplink data sent by the user equipment to the core network, an identifier of a node next to the last node is a bearer identifier of the core network; or when the any node is a last node in the data forwarding path, and the data packet is downlink data sent by the core network to the user equipment, an identifier of a node next to the last node is an air interface bearer identifier of the user equipment.

With reference to the first possible implementation of the second aspect, in a third possible implementation, the forwarding, by the node, the data packet to a next node according to routing information corresponding to the node includes:

determining, by the node, the transmission queue of the data packet according to the queue identifier in the routing information that is corresponding to the node and that is in the configuration information of the header of the data packet, and forwarding the data packet to the next node according to the scheduling information of the transmission queue on the node and the identifier that is of the next node and that is in the routing information corresponding to the node.

With reference to the first possible implementation of the second aspect, in a fourth possible implementation, the scheduling information of the transmission queue on the any node includes:

priority information allocated by the controller to the transmission queue on the any node; or corresponding quality of service information allocated by the controller to the transmission queue, where the any node determines priority information of the transmission queue on the any node according to the quality of service information.

According to a third aspect, the embodiments of the present disclosure provide still another data processing method, where the method includes:

receiving, by a node from an interface connected to a previous node, a data packet forwarded by the previous node, where a header of the data packet includes configuration information carrying a data forwarding path, the node is a node, except a first node, in the data forwarding path, the configuration information includes routing information corresponding to the node, the routing information corresponding to the node includes a queue identifier allocated by the controller to the data packet, and the queue identifier is used to identify a transmission queue to which the data packet belongs; and obtaining, by the node, the queue identifier of the data packet from the routing information corresponding to the node, and buffering the data packet into the transmission queue according to the queue identifier; and forwarding, by the node, the data packet to a next node according to an identifier that is of the next node and that is stored by the node and according to scheduling information of the transmission queue on the node.

With reference to the third aspect, in a first possible implementation, the method further includes:

when the data forwarding path is used for the first time to forward the data packet or the data forwarding path changes, obtaining, by the node from the routing information that is corresponding to the node and that is in the configuration information, the queue identifier of the data packet, the identifier of the node next to the node, and the scheduling information of the transmission queue on the node;

buffering, by the node, the data packet into the transmission queue according to the queue identifier; and forwarding, by the node, the data packet to the next node according to the identifier of the next node and the scheduling information of the transmission queue on the node, and storing the identifier of the next node and the scheduling information of the transmission queue on the node.

With reference to the third aspect or the first possible implementation of the third aspect, in a second possible implementation, the scheduling information of the transmission queue on the node includes:

priority information allocated by the controller to the transmission queue on the node; or corresponding quality of service information allocated by the controller to the transmission queue, where the node determines priority information of the transmission queue on the node according to the quality of service information.

According to a fourth aspect, the embodiments of the present disclosure provide a controller, where the controller includes:

a path determining unit, configured to determine a data forwarding path used for data packet transmission between user equipment and a core network; and a processing unit, configured to send a data packet filtering rule and configuration information carrying the data forwarding path to a first node in the data forwarding path, where the filtering rule is used to match configuration information corresponding to a data packet of the first node, the configuration information includes routing information corresponding to each node in the data forwarding path, routing information corresponding to any node in the data forwarding path includes a queue identifier allocated by the controller to the data packet, and the queue identifier is used to identify a transmission queue to which the data packet belongs.

With reference to the fourth aspect, in a first possible implementation, when the data forwarding path is used for the first time to forward the data packet or the data forwarding path changes, the routing information corresponding to the any node in the data forwarding path further includes:

an identifier of a node next to the any node and scheduling information of the transmission queue on the any node.

With reference to the first possible implementation of the fourth aspect, in a second possible implementation, when the any node is a last node in the data forwarding path, and the data packet is uplink data sent by the user equipment to the core network, an identifier of a node next to the last node is a bearer identifier of the core network; or when the any node is a last node in the data forwarding path, and the data packet is downlink data sent by the core network to the user equipment, an identifier of a node next to the last node is an air interface bearer identifier of the user equipment.

With reference to the first possible implementation of the fourth aspect, in a third possible implementation, the scheduling information of the transmission queue on the any node includes:

priority information allocated by the controller to the transmission queue on the any node; or corresponding quality of service information allocated by the controller to the transmission queue, where the any node determines priority information of the transmission queue on the any node according to the quality of service information.

According to a fifth aspect, the embodiments of the present disclosure provide a node, where the node includes:

a receiving unit, configured to receive a data packet filtering rule and configuration information carrying a data forwarding path that are sent by a controller, where the data forwarding path represents a forwarding path used for data packet transmission between user equipment and a core network, the configuration information includes routing information corresponding to each node in the data forwarding path, routing information corresponding to any node in the data forwarding path includes a queue identifier allocated by the controller to a data packet, and the queue identifier is used to identify a transmission queue to which the data packet belongs; and a processing unit, configured to: receive the data packet from an interface connected to the core network or the user equipment, find, according to a result of matching the data packet against the filtering rule, the configuration information corresponding to the data packet, add the configuration information to a header of the data packet, and forward the data packet to a next node according to routing information corresponding to the node.

With reference to the fifth aspect, in a first possible implementation, when the data forwarding path is used for the first time to forward the data packet or the data forwarding path changes, the routing information corresponding to the any node in the data forwarding path further includes:

an identifier of a node next to the any node and scheduling information of the transmission queue on the any node.

With reference to the first possible implementation of the fifth aspect, in a second possible implementation, when the any node is a last node in the data forwarding path, and the data packet is uplink data sent by the user equipment to the core network, an identifier of a node next to the last node is a bearer identifier of the core network; or when the any node is a last node in the data forwarding path, and the data packet is downlink data sent by the core network to the user equipment, an identifier of a node next to the last node is an air interface bearer identifier of the user equipment.

With reference to the first possible implementation of the fifth aspect, in a third possible implementation, the processing unit is specifically configured to:

determine the transmission queue of the data packet according to the queue identifier in the routing information that is corresponding to the node and that is in the configuration information of the header of the data packet, and forward the data packet to the next node according to the scheduling information of the transmission queue on the node and the identifier that is of the next node and that is in the routing information corresponding to the node.

With reference to the first possible implementation of the fifth aspect, in a fourth possible implementation, the scheduling information of the transmission queue on the any node includes:

priority information allocated by the controller to the transmission queue on the any node; or corresponding quality of service information allocated by the controller to the transmission queue, where the any node determines priority information of the transmission queue on the any node according to the quality of service information.

According to a sixth aspect, the embodiments of the present disclosure provide a node, where the node includes:

a receiving unit, configured to receive, from an interface connected to a previous node, a data packet forwarded by the previous node, where a header of the data packet includes configuration information carrying a data forwarding path, the node is a node, except a first node, in the data forwarding path, the configuration information includes routing information corresponding to the node, the routing information corresponding to the node includes a queue identifier allocated by the controller to the data packet, and the queue identifier is used to identify a transmission queue to which the data packet belongs;

a first processing unit, configured to: obtain the queue identifier of the data packet from the routing information corresponding to the node, and buffer the data packet into the transmission queue according to the queue identifier; and a second processing unit, configured to forward the data packet to a next node according to an identifier that is of the next node and that is stored by the second processing unit and according to scheduling information of the transmission queue on the node.

With reference to the sixth aspect, in a first possible implementation, when the data forwarding path is used for the first time to forward the data packet or the data forwarding path changes, the first processing unit is specifically configured to: obtain, from the routing information that is corresponding to the node and that is in the configuration information, the queue identifier of the data packet, the identifier of the node next to the node, and the scheduling information of the transmission queue on the node; and buffer the data packet into the transmission queue according to the queue identifier; and the second processing unit is specifically configured to: forward the data packet to the next node according to the identifier of the next node and the scheduling information of the transmission queue on the node, and store the identifier of the next node and the scheduling information of the transmission queue on the node.

With reference to the sixth aspect or the first possible implementation of the sixth aspect, in a second possible implementation, the scheduling information of the transmission queue on the node includes:

priority information allocated by the controller to the transmission queue on the node; or corresponding quality of service information allocated by the controller to the transmission queue, where the node determines priority information of the transmission queue on the node according to the quality of service information.

According to a seventh aspect, the embodiments of the present disclosure provide a controller, where the controller includes: a communications interface, a memory, and a processor; the communications interface is configured to communicate with a network element; the memory is configured to store computer code; and the processor is configured to execute the computer code, so as to:

determine a data forwarding path used for data packet transmission between user equipment and a core network; and send a data packet filtering rule and configuration information carrying the data forwarding path to a first node in the data forwarding path, where the filtering rule is used to match configuration information corresponding to a data packet of the first node, the configuration information includes routing information corresponding to each node in the data forwarding path, routing information corresponding to any node in the data forwarding path includes a queue identifier allocated by the controller to the data packet, and the queue identifier is used to identify a transmission queue to which the data packet belongs.

With reference to the seventh aspect, in a first possible implementation, when the data forwarding path is used for the first time to forward the data packet or the data forwarding path changes, the routing information corresponding to the any node in the data forwarding path further includes:

an identifier of a node next to the any node and scheduling information of the transmission queue on the any node.

With reference to the first possible implementation of the seventh aspect, in a second possible implementation, when the any node is a last node in the data forwarding path, and the data packet is uplink data sent by the user equipment to the core network, an identifier of a node next to the last node is a bearer identifier of the core network; or when the any node is a last node in the data forwarding path, and the data packet is downlink data sent by the core network to the user equipment, an identifier of a node next to the last node is an air interface bearer identifier of the user equipment.

With reference to the first possible implementation of the seventh aspect, in a third possible implementation, the scheduling information of the transmission queue on the any node includes:

priority information allocated by the controller to the transmission queue on the any node; or corresponding quality of service information allocated by the controller to the transmission queue, where the any node determines priority information of the transmission queue on the any node according to the quality of service information.

According to an eighth aspect, the embodiments of the present disclosure provide a node, where the node includes: a communications interface, a memory, and a processor; the communications interface is configured to communicate with a network element; the memory is configured to store computer code; and the processor is configured to execute the computer code, so as to:

receive a data packet filtering rule and configuration information carrying a data forwarding path that are sent by a controller, where the data forwarding path represents a forwarding path used for data packet transmission between user equipment and a core network, the configuration information includes routing information corresponding to each node in the data forwarding path, routing information corresponding to any node in the data forwarding path includes a queue identifier allocated by the controller to a data packet, and the queue identifier is used to identify a transmission queue to which the data packet belongs; and receive the data packet from an interface connected to the core network or the user equipment, find, according to a result of matching the data packet against the filtering rule, the configuration information corresponding to the data packet, add the configuration information to a header of the data packet, and forward the data packet to a next node according to routing information corresponding to the node.

With reference to the eighth aspect, in a first possible implementation, when the data forwarding path is used for the first time to forward the data packet or the data forwarding path changes, the routing information corresponding to the any node in the data forwarding path further includes:

an identifier of a node next to the any node and scheduling information of the transmission queue on the any node.

With reference to the first possible implementation of the eighth aspect, in a second possible implementation, when the any node is a last node in the data forwarding path, and the data packet is uplink data sent by the user equipment to the core network, an identifier of a node next to the last node is a bearer identifier of the core network; or when the any node is a last node in the data forwarding path, and the data packet is downlink data sent by the core network to the user equipment, an identifier of a node next to the last node is an air interface bearer identifier of the user equipment.

With reference to the first possible implementation of the eighth aspect, in a third possible implementation, the processor is further configured to execute the computer code, so as to:

determine the transmission queue of the data packet according to the queue identifier in the routing information that is corresponding to the node and that is in the configuration information of the header of the data packet, and forward the data packet to the next node according to scheduling information of the transmission queue on the node and the identifier that is of the next node and that is in the routing information corresponding to the node.

With reference to the first possible implementation of the eighth aspect, in a fourth possible implementation, the scheduling information of the transmission queue on the any node includes:

priority information allocated by the controller to the transmission queue on the any node; or corresponding quality of service information allocated by the controller to the transmission queue, where the any node determines priority information of the transmission queue on the any node according to the quality of service information.

According to a ninth aspect, the embodiments of the present disclosure provide a node, where the node includes: a communications interface, a memory, and a processor; the communications interface is configured to communicate with a network element; the memory is configured to store computer code; and the processor is configured to execute the computer code, so as to:

receive, from an interface connected to a previous node, a data packet forwarded by the previous node, where a header of the data packet includes configuration information carrying a data forwarding path, the node is a node, except a first node, in the data forwarding path, the configuration information includes routing information corresponding to the node, the routing information corresponding to the node includes a queue identifier allocated by the controller to the data packet, and the queue identifier is used to identify a transmission queue to which the data packet belongs; and obtain the queue identifier of the data packet from the routing information corresponding to the node, and buffer the data packet into the transmission queue according to the queue identifier; and forward the data packet to a next node according to an identifier that is of the next node and that is stored by the node and according to scheduling information of the transmission queue on the node.

With reference to the ninth aspect, in a first possible implementation, the processor is further configured to execute the computer code, so as to:

when the data forwarding path is used for the first time to forward the data packet or the data forwarding path changes, obtain, from the routing information that is corresponding to the node and that is in the configuration information, the queue identifier of the data packet, the identifier of the node next to the node, and the scheduling information of the transmission queue on the node;

buffer the data packet into the transmission queue according to the queue identifier; and forward the data packet to the next node according to the identifier of the next node and the scheduling information of the transmission queue on the node, and store the identifier of the next node and the scheduling information of the transmission queue on the node.

With reference to the ninth aspect or the first possible implementation of the ninth aspect, in a second possible implementation, the scheduling information of the transmission queue on the node includes:

priority information allocated by the controller to the transmission queue on the node; or corresponding quality of service information allocated by the controller to the transmission queue, where the node determines priority information of the transmission queue on the node according to the quality of service information.

According to the data processing method and the device that are provided in the embodiments of the present disclosure, first, a controller determines a data packet filtering rule and a data forwarding path used for data packet transmission between user equipment and a core network; then the controller sends the data packet filtering rule and configuration information carrying the data forwarding path to a first node in the data forwarding path, where the filtering rule is used to match configuration information corresponding to a data packet of the first node, the configuration information includes routing information corresponding to each node in the data forwarding path, routing information corresponding to any node in the data forwarding path includes a queue identifier allocated by the controller to the data packet, and the queue identifier is used to identify a transmission queue to which the data packet belongs; and finally, the first node and a remaining node forward the data packet according to the configuration information of a header of the data packet. According to technical solutions provided in the present disclosure, control signaling needs to be sent only to the first node in the data forwarding path by using an air interface, and control signaling sent by using the air interface is reduced, so that bandwidth utilization of the air interface is improved.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

Figure 1:
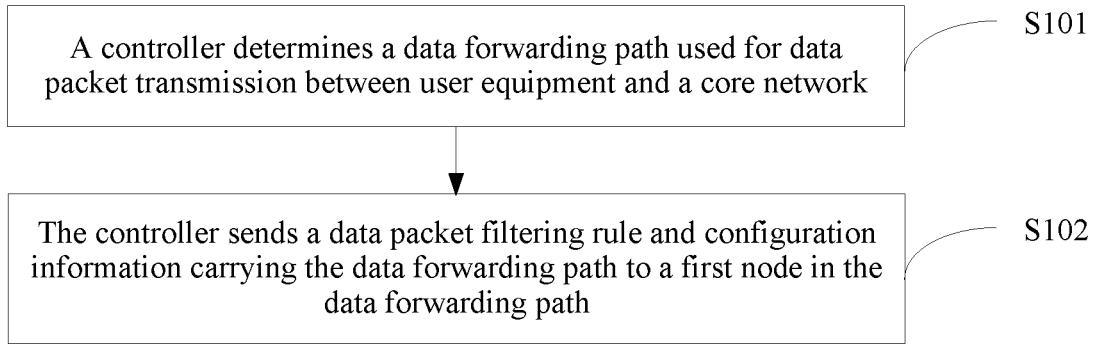
FIG. 1 is a schematic flowchart of a data processing method according to an embodiment of the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

A Software Defined Network (Software Defined Network, SDN) technology is proposed for a fixed network. In the SDN technology, after determining a data forwarding path, a controller sends configuration information of the data forwarding path to each router node in the data forwarding path. Consequently, signaling transmission overheads are relatively high. If the SDN technology is applied to a wireless backhaul line network, the overheads occupy a large amount of bandwidth, and the wireless backhaul line network is severely affected. For signaling transmission overheads in the fixed network, a source routing technology applied to the SDN is proposed: A controller sends a source routing option information of a data packet, that is, an Internet Protocol (Internet Protocol, IP) address of each router node through which the data packet needs to pass, to a first router node (hereinafter referred to as a first node) in a data forwarding path; the first node adds the source routing option information to an IP header of the data packet, and also adds a destination IP address of the data packet to the IP header; the first node and a remaining node in the data forwarding path forwards the data packet according to the source routing option information; and finally, a last node sends the data packet to a destination device according to the destination IP address in the IP header. The foregoing solution does not work in the wireless backhaul line network. Data transmission on each node (base station) in the wireless backhaul line network is scheduled based on a wireless channel bearer. If the source routing solution is used, signaling (including the source routing option information of the data packet) is sent only to the first node. However, a general base station cannot recognize the source routing option information in the IP header of the data packet without support for the IP protocol stack, and consequently, an intermediate processing node cannot forward the data packet.

To resolve a problem that the base station does not support an IP protocol stack and consequently cannot recognize the source routing option information in the IP header, embodiments of the present disclosure provide a technical solution: New source routing option information is designed as configuration information of the data forwarding path and is delivered by the controller to a first node in the path, where the configuration information includes routing information of each node in the path, routing information of any node includes a queue identifier allocated by the controller to the data packet, the queue identifier is used to identify a transmission queue that is on the node (that is, the base station) and to which the data packet belongs, and the node (that is, the base station) can identify the queue identifier; and when the path is used for the first time to forward the data packet, the routing information of the any node further includes: an identifier of a node next to the node, which may be a port number, a node identifier, or the like, and priority information allocated by the controller to the transmission queue of the data packet on the node. In addition, a node in the data forwarding path may store an identifier of a next node and priority information of a transmission queue after forwarding a data packet once, so that the first node may add configuration information to the data packet provided that there is a queue identifier in routing information of the node. It can be learned from the foregoing content that in a data packet forwarding process in the embodiments of the present disclosure, the base station can implement data packet forwarding without support for the IP stack.

An embodiment of the present disclosure provides a data processing method, and the method is based on a controller side. As shown in FIG. 1, the method includes the following steps.

S101. A controller determines a data forwarding path used for data packet transmission between user equipment and a core network.

For example, it is assumed that a data packet needs to be transmitted between user equipment 1 and a core network. The controller calculates a data forwarding path for the data packet according to a base station that is managed by the controller and that is in a wireless backhaul line network.

S102. The controller sends a data packet filtering rule and configuration information carrying the data forwarding path to a first node in the data forwarding path.

The filtering rule is used to match configuration information corresponding to a data packet of the first node, the configuration information includes routing information corresponding to each node in the data forwarding path, routing information corresponding to any node in the data forwarding path includes a queue identifier allocated by the controller to the data packet, and the queue identifier is used to identify a transmission queue to which the data packet belongs.

According to the data processing method provided in this embodiment of the present disclosure, a controller determines a data forwarding path used for data packet transmission between user equipment and a core network; and the controller sends a data packet filtering rule and configuration information carrying the data forwarding path to a first node in the data forwarding path. The filtering rule is used to match configuration information corresponding to a data packet of the first node, the configuration information includes routing information corresponding to each node in the data forwarding path, routing information corresponding to any node in the data forwarding path includes a queue identifier allocated by the controller to the data packet, and the queue identifier is used to identify a transmission queue to which the data packet belongs. The controller needs to send control signaling only to the first node in the data forwarding path by using an air interface, and control signaling sent by using the air interface is reduced, so that bandwidth utilization of the air interface is improved.

Figure 2:
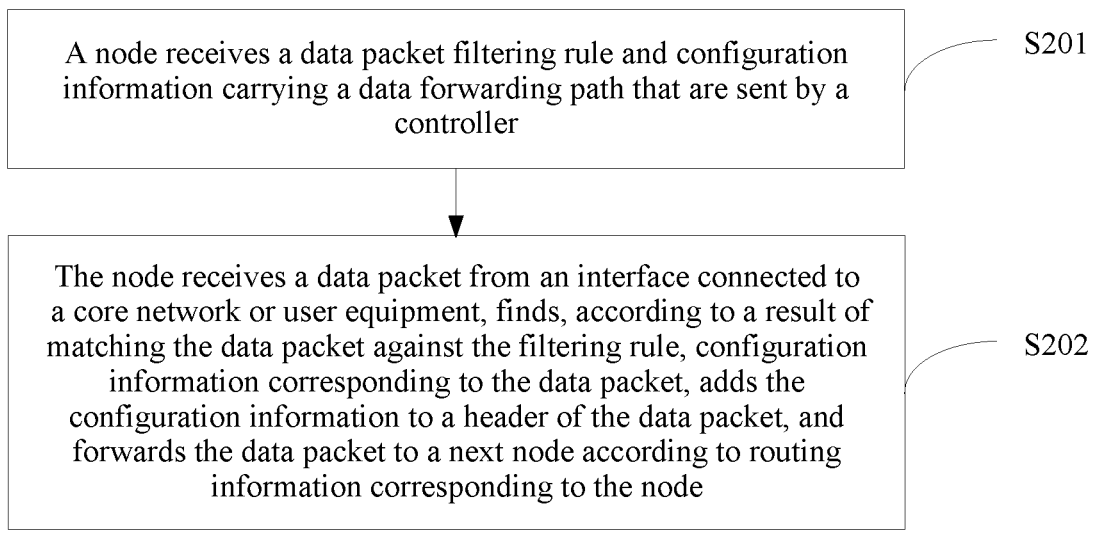
FIG. 2 is a schematic flowchart of another data processing method according to an embodiment of the present disclosure.

An embodiment of the present disclosure provides a data processing method. As shown in FIG. 2, the method is based on a first node in a data forwarding path, and the method includes the following steps.

S201. A node receives a data packet filtering rule and configuration information carrying a data forwarding path that are sent by a controller.

The data forwarding path represents a forwarding path used for data packet transmission between user equipment and a core network, configuration information includes routing information corresponding to each node in the data forwarding path, routing information corresponding to any node in the data forwarding path includes a queue identifier allocated by the controller to a data packet, and the queue identifier is used to identify a transmission queue to which the data packet belongs.

S202. The node receives a data packet from an interface connected to a core network or user equipment, finds, according to a result of matching the data packet against the filtering rule, configuration information corresponding to the data packet, adds the configuration information to a header of the data packet, and forwards the data packet to a next node according to routing information corresponding to the node.

According to the data processing method provided in this embodiment of the present disclosure, a node receives a data packet filtering rule and configuration information carrying a data forwarding path that are sent by a controller, where the data forwarding path represents a forwarding path used for data packet transmission between user equipment and a core network, configuration information includes routing information corresponding to each node in the data forwarding path, routing information corresponding to any node in the data forwarding path includes a queue identifier allocated by the controller to a data packet, and the queue identifier is used to identify a transmission queue to which the data packet belongs; and the node receives the data packet from an interface connected to the core network or the user equipment, finds, according to a result of matching the data packet against the filtering rule, configuration information corresponding to the data packet, adds the configuration information to a header of the data packet, and forwards the data packet to a next node according to the routing information corresponding to the node. The controller needs to send control signaling only to the first node in the data forwarding path by using an air interface, and control signaling sent by using the air interface is reduced, so that bandwidth utilization of the air interface is improved.

Figure 3:
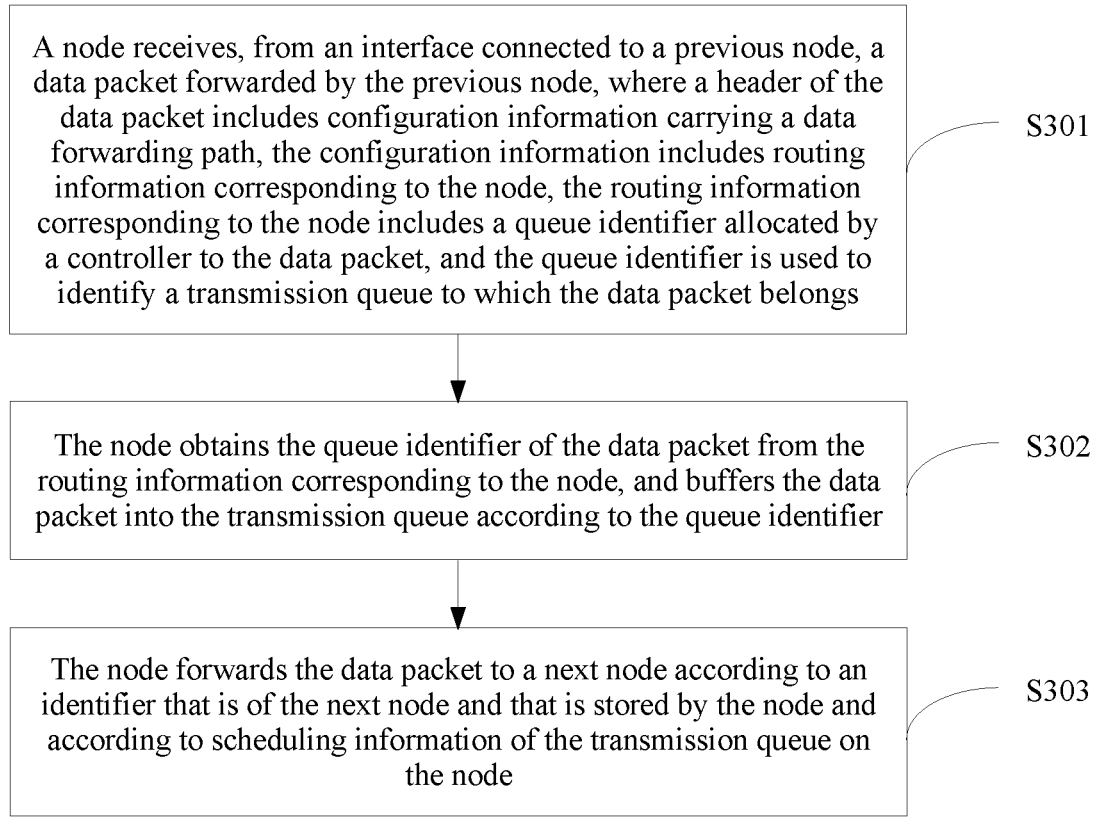
FIG. 3 is a schematic flowchart of still another data processing method according to an embodiment of the present disclosure.

An embodiment of the present disclosure provides a data processing method. As shown in FIG. 3, the method is based on an intermediate processing node in a data forwarding path, and the method includes the following steps.

S301. A node receives, from an interface connected to a previous node, a data packet forwarded by the previous node, where a header of the data packet includes configuration information carrying a data forwarding path, the configuration information includes routing information corresponding to the node, the routing information corresponding to the node includes a queue identifier allocated by a controller to the data packet, and the queue identifier is used to identify a transmission queue to which the data packet belongs.

S302. The node obtains the queue identifier of the data packet from the routing information corresponding to the node, and buffers the data packet into the transmission queue according to the queue identifier.

S303. The node forwards the data packet to a next node according to an identifier that is of the next node and that is stored by the node and according to scheduling information of the transmission queue on the node.

According to the data processing method provided in this embodiment of the present disclosure, a node receives, from an interface connected to a previous node, a data packet forwarded by the previous node, where a header of the data packet includes configuration information carrying a data forwarding path, the configuration information includes routing information corresponding to each node in the data forwarding path, routing information corresponding to any node in the data forwarding path includes a queue identifier allocated by a controller to the data packet, and the queue identifier is used to identify a transmission queue to which the data packet belongs; the node obtains the queue identifier of the data packet from the routing information corresponding to the node, and buffers the data packet into the transmission queue according to the queue identifier; and the node forwards the data packet to a next node according to an identifier that is of the next node and that is stored by the node and according to scheduling information of the transmission queue on the node. An intermediate processing node, except a first node, in the data forwarding path obtains, from the previous node, related information required for forwarding the data packet. In this way, the controller may implement data packet forwarding by sending control signaling only to the first node in the data forwarding path by using an air interface, and control signaling sent by using the air interface is reduced, so that bandwidth utilization of the air interface is improved.

Figure 4:
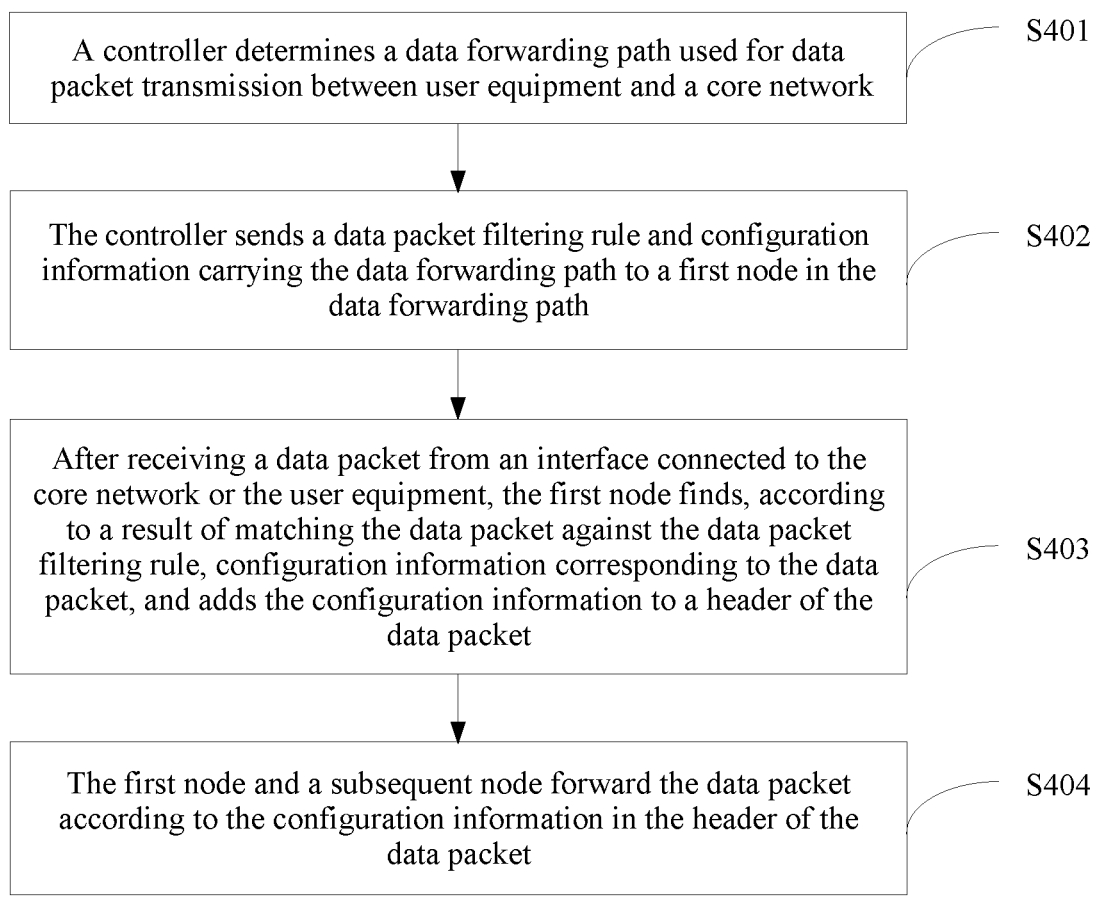
FIG. 4 is a schematic flowchart of yet another data processing method according to an embodiment of the present disclosure.

To make persons skilled in the art more clearly understand the technical solutions provided in the embodiments of the present disclosure, by using a specific embodiment, the following describes in detail the data processing method provided in the embodiments of the present disclosure. As shown in FIG. 4, the method includes the following steps.

S401. A controller determines a data forwarding path used for data packet transmission between user equipment and a core network.

Specifically, the controller in a wireless backhaul line network calculates the data forwarding path for the user equipment and the core network. For example, it is assumed that a data packet needs to be transmitted between user equipment 1 and a core network. The controller calculates a data forwarding path for the user equipment 1 and the core network: a node A (close to the user equipment 1)—a node B—a node C—a node D (close to the core network). It should be noted that when uplink data is transmitted between the user equipment 1 and the core network, the node A is a first node in the data forwarding path, and the node D is a last node in the data forwarding path; and when downlink data is transmitted between the user equipment 1 and the core network, the node D is a first node in the data forwarding path, and the node A is a last node in the data forwarding path. In addition, any node in the wireless backhaul line network may be shared by multiple data forwarding paths.

S402. The controller sends a data packet filtering rule and configuration information carrying the data forwarding path to a first node in the data forwarding path.

Figure 5:
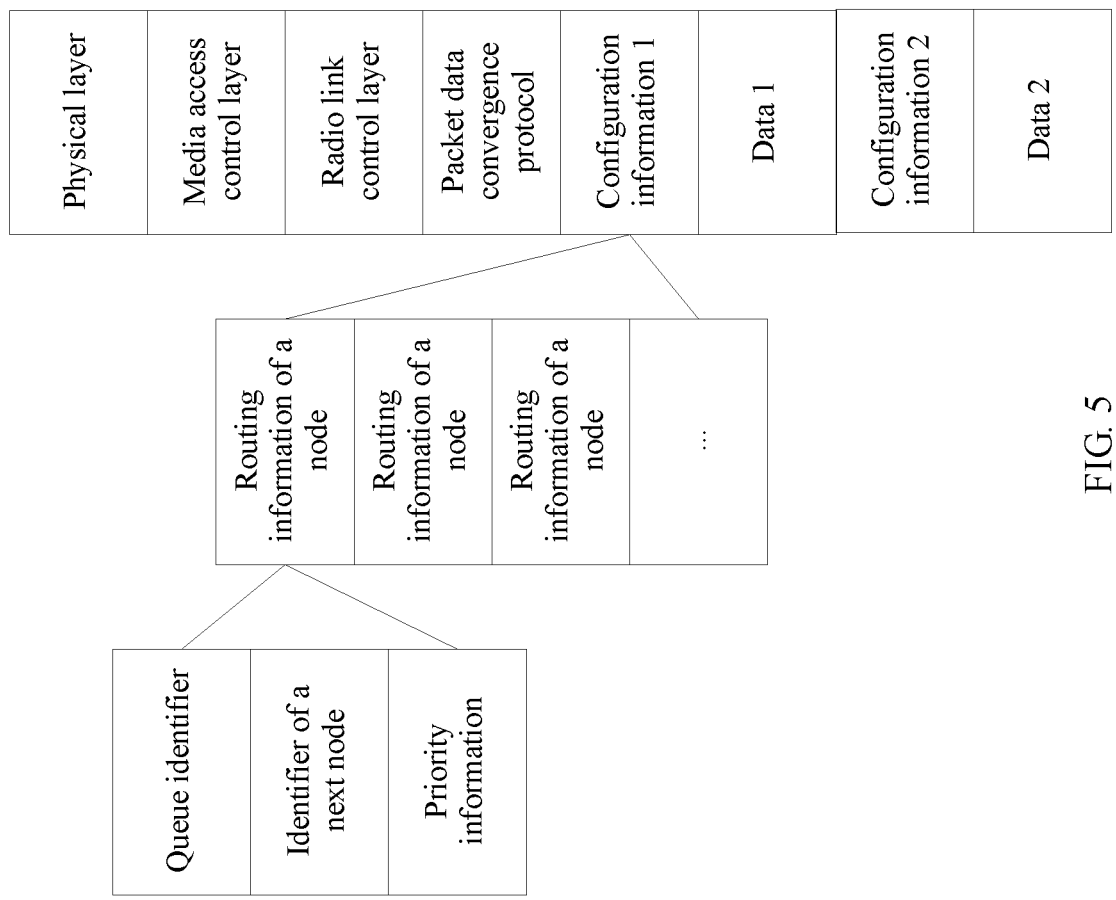
FIG. 5 is a schematic diagram of composition of configuration information of a header of a data packet according to an embodiment of the present disclosure.

As shown in FIG. 5, the configuration information includes routing information corresponding to each node in the data forwarding path. Routing information corresponding to any node in the data forwarding path includes a queue identifier allocated by the controller to a data packet, and the queue identifier is used to identify a transmission queue to which the data packet belongs. The data packet filtering rule includes a filtering rule for a data packet of a data flow between each piece of user equipment and the core network. The data packet filtering rule is used, when the first node receives a data packet of a data flow between user equipment and the core network, by the first node to recognize, according to the data packet filtering rule sent by the controller, configuration information corresponding to the data packet of the data flow between the user equipment and the core network.

It should be noted that queue identifiers allocated by the controller to data packets on all nodes in the data forwarding path may be the same, that is, the queue identifiers are valid in a control area of the controller, and are unique in all nodes in the control area; or queue identifiers allocated by the controller to the data packet on all nodes in the data forwarding path may be different from one another, that is, the queue identifier is valid only on a current node, and is unique on each node. In addition, after the data packet transmission between the user equipment and the core network is completed, the controller may recycle the queue identifier corresponding to the node, so that the queue identifier may be allocated to another node for reuse; and when the data forwarding path changes, the controller may also recycle and reallocate the queue identifier.

It should be noted that when the data forwarding path is used for the first time to forward the data packet or the data forwarding path changes, the routing information corresponding to the any node in the data forwarding path further includes: an identifier of a node next to the any node and priority information allocated by the controller to the transmission queue of the data packet on the any node. When the any node is a last node in the data forwarding path, and the data packet is uplink data sent by the user equipment to the core network, an identifier of anode next to the last node is a bearer identifier of the core network, for example, a tunnel endpoint identifier (Tunnel Endpoint Identifier, TEID); or when the any node is a last node in the data forwarding path and the data packet is downlink data sent by the core network to the user equipment, an identifier of a node next to the last node is an air interface bearer identifier of the user equipment, for example, a logical channel identifier (Logical Channel Identify, LCID).

It should be further noted that when each node in the data forwarding path transmits a data packet between the user equipment and the core network, an identifier of a next node corresponding to each node and priority information of the transmission queue corresponding to the data packet on each node may be stored. In this way, when the data forwarding path is not changed, the first node needs to add, only when forwarding the data packet for the first time, an identifier of a node next to the node and priority information that is of the transmission queue and that is corresponding to the data packet on the node, to the routing information that is in the configuration information of the header of the data packet and that is corresponding to each node.

S403. After receiving a data packet from an interface connected to the core network or the user equipment, the first node finds, according to a result of matching the data packet against the data packet filtering rule, configuration information corresponding to the data packet, and adds the configuration information to a header of the data packet.

For example, it is assumed that a data forwarding path is a node A (close to user equipment 1)—a node B—a node C—a node D (close to a core network). When uplink data is transmitted for the first time between the user equipment 1 and the core network, the first node A receives a data packet filtering rule and configuration information of a data forwarding path that are sent by a controller; matching a data packet against the data packet filtering rule, so as to determine that the data packet is a data packet of the user equipment 1, and to further determine configuration information of a data forwarding path of the user equipment 1 corresponding to the data packet; and adds the configuration information to a header of the data packet. The configuration information includes routing information of the nodes A, B, C, and D (a last node). The routing information of the node A includes a queue identifier allocated by the controller to the data packet, an identifier of the node B, and scheduling information of a transmission queue corresponding to the data packet on the node A; the routing information of the node B and the node C is similar to that of the node A; and the routing information of the node D includes the queue identifier allocated by the controller to the data packet, scheduling information of the transmission queue corresponding to the data packet on the node D, and a TEID of the core network.

It should be noted that scheduling information of the transmission queue corresponding to the data packet on any node of the node A, B, C, or D includes: priority information allocated by the controller to the transmission queue on the any node; or corresponding quality of service (Quality of Service, QoS) information allocated by the controller to the transmission queue, where the any node determines priority information of the transmission queue on the any node according to the QoS information.

S404. The first node and a subsequent node forward the data packet according to the configuration information in the header of the data packet.

For example, based on the assumption in S403, after finding, according to the queue identifier of the data packet, the transmission queue corresponding to the data packet, the node A saves the data packet in the transmission queue, and then forwards the data packet to the node B according to the scheduling information corresponding to the transmission queue; the node B forwards the data packet to the node C; the node C forwards the data packet to the node D; and the node D forwards the data packet to the core network according to the TEID of the core network.

The following describes a process of forwarding a data packet by an intermediate node in a data forwarding path, and a node B is used as an example for description. After receiving the data packet, the node B first removes configuration information from the data packet, recognizes a queue identifier carried in routing information that is of the node B and that is in the configuration information, finds a corresponding transmission queue of the data packet on the current node B, and saves a data packet whose configuration information is removed into the foregoing transmission queue. If information carried in the configuration information changes (for example, the queue identifier allocated by a controller to the data packet changes; in a newly calculated data forwarding path delivered by the controller, a node next to the node B changes from a node C to a node F; and priority information of the transmission queue of the data packet changes), the node B performs scheduling according to new priority information of the transmission queue of the data packet, and extracts the data packet from the transmission queue (note: data packets received previously may be converged or split at this time); and the node B adds updated configuration information to a header of the data packet, forwards the data packet to the node F, updates an identifier of the next node (the node C) previously saved by the node B to an identifier of the node F, and updates priority information of the transmission queue.

According to the data processing method provided in this embodiment of the present disclosure, first, a controller determines a data forwarding path used for data packet transmission between user equipment and a core network; then the controller sends a data packet filtering rule and configuration information carrying the data forwarding path to a first node in the data forwarding path, where the filtering rule is used to match configuration information corresponding to a data packet of the first node, the configuration information includes routing information corresponding to each node in the data forwarding path, routing information corresponding to any node in the data forwarding path includes a queue identifier allocated by the controller to the data packet, and the queue identifier is used to identify a transmission queue to which the data packet belongs; and finally, the first node and a remaining node forward the data packet according to the configuration information of a header of the data packet. According to the data processing method provided in this embodiment of the present disclosure, control signaling needs to be sent only to the first node in the data forwarding path by using an air interface, and control signaling sent by using the air interface is reduced, so that bandwidth utilization of the air interface is improved.

Figure 6:
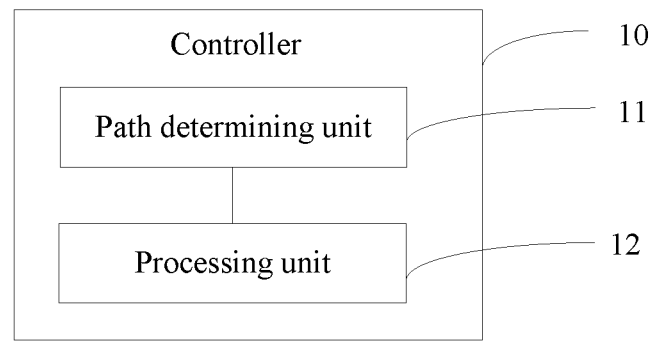
FIG. 6 is a schematic structural diagram of a controller according to an embodiment of the present disclosure.

An embodiment of the present disclosure provides a controller 10. As shown in FIG. 6, the controller 10 includes:

a path determining unit 11, configured to determine a data forwarding path used for data packet transmission between user equipment and a core network; and a processing unit 12, configured to send a data packet filtering rule and configuration information carrying the data forwarding path to a first node in the data forwarding path, where the filtering rule is used to match configuration information corresponding to a data packet of the first node, the configuration information includes routing information corresponding to each node in the data forwarding path, routing information corresponding to any node in the data forwarding path includes a queue identifier allocated by the controller to the data packet, and the queue identifier is used to identify a transmission queue to which the data packet belongs.

Optionally, when the data forwarding path is used for the first time to forward the data packet or the data forwarding path changes, the routing information corresponding to the any node in the data forwarding path further includes:

an identifier of a node next to the any node and scheduling information of the transmission queue on the any node.

Optionally, when the any node is a last node in the data forwarding path, and the data packet is uplink data sent by the user equipment to the core network, an identifier of a node next to the last node is a bearer identifier of the core network; or when the any node is a last node in the data forwarding path, and the data packet is downlink data sent by the core network to the user equipment, an identifier of a node next to the last node is an air interface bearer identifier of the user equipment.

Optionally, the scheduling information of the transmission queue on the any node includes:

priority information allocated by the controller to the transmission queue on the any node; or corresponding quality of service information allocated by the controller to the transmission queue, where the any node determines priority information of the transmission queue on the any node according to the quality of service information.

According to the controller provided in this embodiment of the present disclosure, the controller determines a data forwarding path used for data packet transmission between user equipment and a core network; and the controller sends a data packet filtering rule and configuration information carrying the data forwarding path to a first node in the data forwarding path. The filtering rule is used to match configuration information corresponding to a data packet of the first node, the configuration information includes routing information corresponding to each node in the data forwarding path, routing information corresponding to any node in the data forwarding path includes a queue identifier allocated by the controller to the data packet, and the queue identifier is used to identify a transmission queue to which the data packet belongs. The controller needs to send control signaling only to the first node in the data forwarding path by using an air interface, and control signaling sent by using the air interface is reduced, so that bandwidth utilization of the air interface is improved.

Figure 7:
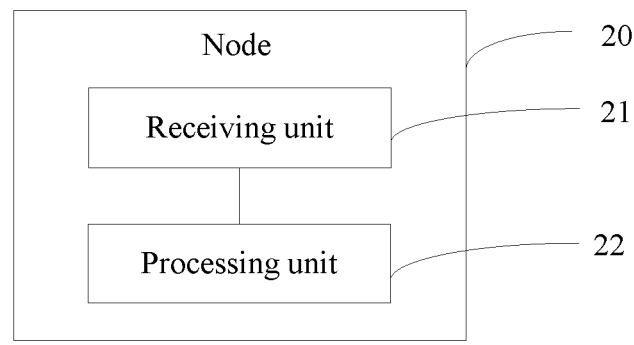
FIG. 7 is schematic structural diagram 1 of a node according to an embodiment of the present disclosure.

An embodiment of the present disclosure provides a node 20. As shown in FIG. 7, the node 20 is a first node in a data forwarding path, and the node 20 includes:

a receiving unit 21, configured to receive a data packet filtering rule and configuration information carrying a data forwarding path that are sent by a controller, where the data forwarding path represents a forwarding path used for data packet transmission between user equipment and a core network, the configuration information includes routing information corresponding to each node in the data forwarding path, routing information corresponding to any node in the data forwarding path includes a queue identifier allocated by the controller to a data packet, and the queue identifier is used to identify a transmission queue to which the data packet belongs; and a processing unit 22, configured to: receive a data packet from an interface connected to the core network or the user equipment, find, according to a result of matching the data packet against the filtering rule, configuration information corresponding to the data packet, add the configuration information to a header of the data packet, and forward the data packet to a next node according to the routing information corresponding to the node.

Optionally, when the data forwarding path is used for the first time to forward the data packet or the data forwarding path changes, the routing information corresponding to the any node in the data forwarding path further includes:

an identifier of a node next to the any node and scheduling information of the transmission queue on the any node.

Optionally, when the any node is a last node in the data forwarding path, and the data packet is uplink data sent by the user equipment to the core network, an identifier of a node next to the last node is a bearer identifier of the core network; or when the any node is a last node in the data forwarding path, and the data packet is downlink data sent by the core network to the user equipment, an identifier of a node next to the last node is an air interface bearer identifier of the user equipment.

Optionally, the processing unit 22 is specifically configured to:

determine the transmission queue of the data packet according to the queue identifier in the routing information that is corresponding to the node and that is in the configuration information of the header of the data packet, and forward the data packet to the next node according to the scheduling information of the transmission queue on the node and the identifier that is of the next node and that is in the routing information corresponding to the node.

Optionally, the scheduling information of the transmission queue on the any node includes:

priority information allocated by the controller to the transmission queue on the any node; or corresponding quality of service information allocated by the controller to the transmission queue, where the any node determines priority information of the transmission queue on the any node according to the quality of service information.

According to the node provided in this embodiment of the present disclosure, the node receives a data packet filtering rule and configuration information carrying a data forwarding path that are sent by a controller, where the data forwarding path represents a forwarding path used for data packet transmission between user equipment and a core network, configuration information includes routing information corresponding to each node in the data forwarding path, routing information corresponding to any node in the data forwarding path includes a queue identifier allocated by the controller to a data packet, and the queue identifier is used to identify a transmission queue to which the data packet belongs; and the node receives a data packet from an interface connected to the core network or the user equipment, finds, according to a result of matching the data packet against the filtering rule, configuration information corresponding to the data packet, adds the configuration information to a header of the data packet, and forwards the data packet to a next node according to the routing information corresponding to the node. The controller needs to send control signaling only to the first node in the data forwarding path by using an air interface, and control signaling sent by using the air interface is reduced, so that bandwidth utilization of the air interface is improved.

Figure 8:
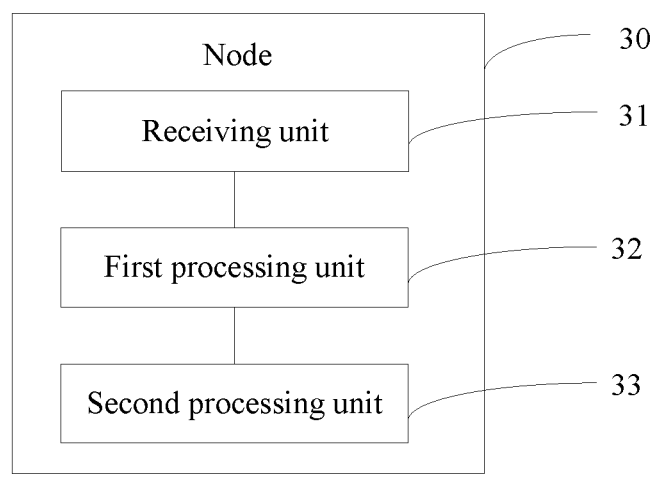
FIG. 8 is schematic structural diagram 1 of another node according to an embodiment of the present disclosure.

An embodiment of the present disclosure provides a node 30. As shown in FIG. 8, the node 30 is a node, except a first node, in a data forwarding path, and the node 30 includes:

a receiving unit 31, configured to receive, from an interface connected to a previous node, a data packet forwarded by the previous node, where a header of the data packet includes configuration information carrying a data forwarding path, the configuration information includes routing information corresponding to the node, the routing information corresponding to the node includes a queue identifier allocated by a controller to the data packet, and the queue identifier is used to identify a transmission queue to which the data packet belongs;

a first processing unit 32, configured to obtain the queue identifier of the data packet from the routing information corresponding to the node, and buffer the data packet into the transmission queue according to the queue identifier; and a second processing unit 33, configured to forward the data packet to a next node according to an identifier that is of the next node and that is stored by the second processing unit 33 and according to scheduling information of the transmission queue on the node.

Optionally, when the data forwarding path is used for the first time to forward the data packet or the data forwarding path changes, the first processing unit 32 is specifically configured to: obtain, from the routing information that is corresponding to the node and that is in the configuration information, the queue identifier of the data packet, the identifier of the node next to the node, and the scheduling information of the transmission queue on the node; and buffer the data packet into the transmission queue according to the queue identifier; and the second processing unit 33 is specifically configured to: forward the data packet to the next node according to the identifier of the next node and the scheduling information of the transmission queue on the node, and store the identifier of the next node and the scheduling information of the transmission queue on the node.

Optionally, the scheduling information of the transmission queue on the node includes:

priority information allocated by the controller to the transmission queue on the node; or corresponding quality of service information allocated by the controller to the transmission queue, where the node determines priority information of the transmission queue on the node according to the quality of service information.

According to the node provided in this embodiment of the present disclosure, the node receives, from an interface connected to a previous node, a data packet forwarded by the previous node, where a header of the data packet includes configuration information carrying a data forwarding path, the configuration information includes routing information corresponding to each node in the data forwarding path, routing information corresponding to any node in the data forwarding path includes a queue identifier allocated by a controller to the data packet, and the queue identifier is used to identify a transmission queue to which the data packet belongs; the node obtains the queue identifier of the data packet from the routing information corresponding to the node, and buffers the data packet into the transmission queue according to the queue identifier; and the node forwards the data packet to a next node according to an identifier that is of the next node and that is stored by the node and according to scheduling information of the transmission queue on the node. An intermediate processing node, except a first node, in the data forwarding path obtains, from previous the node, related information required for forwarding the data packet. In this way, the controller may implement data packet forwarding by sending control signaling only to the first node in the data forwarding path by using an air interface, and control signaling sent by using the air interface is reduced, so that bandwidth utilization of the air interface is improved.

Figure 9:
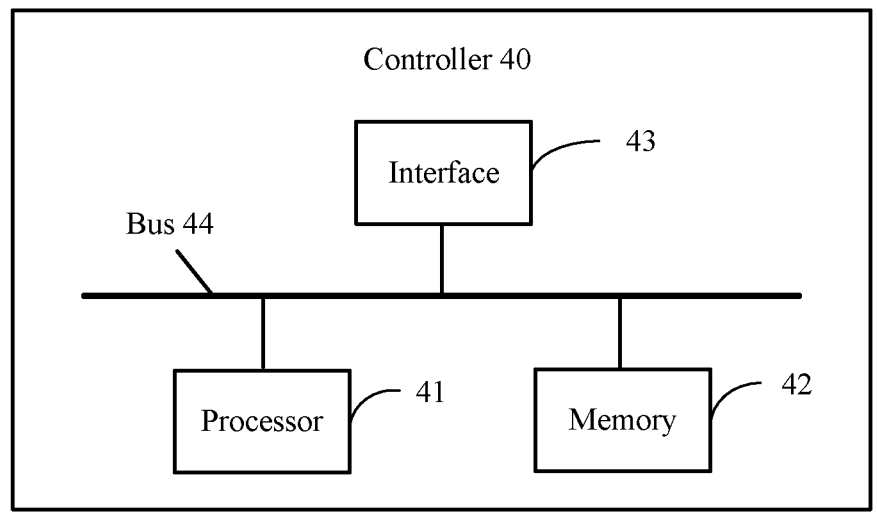
FIG. 9 is a schematic structural diagram of another controller according to an embodiment of the present disclosure.

An embodiment of the present disclosure provides a controller 40. As shown in FIG. 9, the controller 40 includes: a bus 44, and a processor 41, a memory 42, and an interface 43 that are connected to the bus 44. The interface 43 is configured to perform communication. The memory 42 is configured to store computer code. The processor 41 is configured to execute the computer code, so as to:

determine a data forwarding path used for data packet transmission between user equipment and a core network; and send a data packet filtering rule and configuration information carrying the data forwarding path to a first node in the data forwarding path, where the filtering rule is used to match configuration information corresponding to a data packet of the first node, the configuration information includes routing information corresponding to each node in the data forwarding path, routing information corresponding to any node in the data forwarding path includes a queue identifier allocated by the controller to the data packet, and the queue identifier is used to identify a transmission queue to which the data packet belongs.

Optionally, when the data forwarding path is used for the first time to forward the data packet or the data forwarding path changes, the routing information corresponding to the any node in the data forwarding path further includes: an identifier of a node next to the any node and scheduling information of the transmission queue on the any node.

Optionally, when the any node is a last node in the data forwarding path, and the data packet is uplink data sent by the user equipment to the core network, an identifier of a node next to the last node is a bearer identifier of the core network; or when the any node is a last node in the data forwarding path, and the data packet is downlink data sent by the core network to the user equipment, an identifier of a node next to the last node is an air interface bearer identifier of the user equipment.

Optionally, the scheduling information of the transmission queue on the any node includes:

priority information allocated by the controller to the transmission queue on the any node; or corresponding quality of service information allocated by the controller to the transmission queue, where the any node determines priority information of the transmission queue on the any node according to the quality of service information.

According to the controller provided in this embodiment of the present disclosure, the controller determines a data forwarding path used for data packet transmission between user equipment and a core network; and the controller sends a data packet filtering rule and configuration information carrying the data forwarding path to a first node in the data forwarding path. The filtering rule is used to match configuration information corresponding to a data packet of the first node, the configuration information includes routing information corresponding to each node in the data forwarding path, routing information corresponding to any node in the data forwarding path includes a queue identifier allocated by the controller to the data packet, and the queue identifier is used to identify a transmission queue to which the data packet belongs. The controller needs to send control signaling only to the first node in the data forwarding path by using an air interface, and control signaling sent by using the air interface is reduced, so that bandwidth utilization of the air interface is improved.

Figure 10:
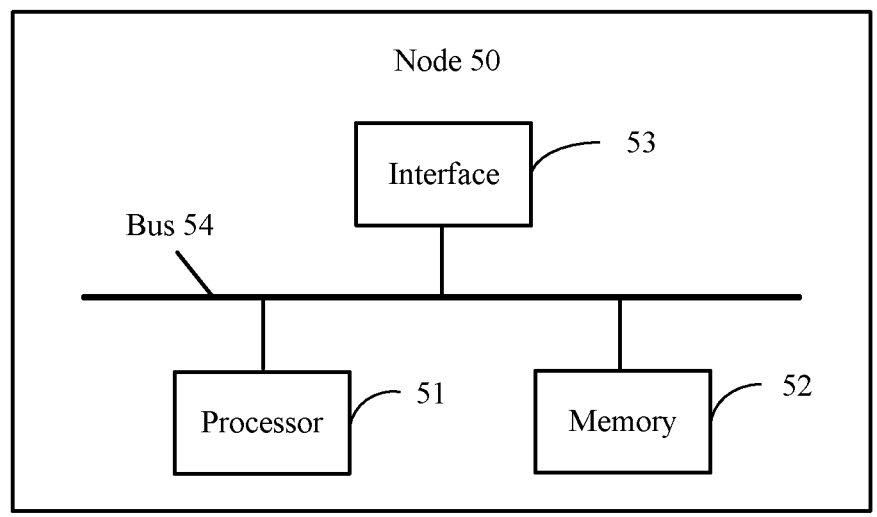
FIG. 10 is schematic structural diagram 2 of a node according to an embodiment of the present disclosure.

An embodiment of the present disclosure provides a node 50. As shown in FIG. 10, the node 50 is a first node in a data forwarding path, and the node 50 includes: a bus 54, and a processor 51, a memory 52, and an interface 53 that are connected to the bus 54. The interface 53 is configured to perform communication. The memory 52 is configured to store computer code. The processor 51 is configured to execute the computer code, so as to:

receive a data packet filtering rule and configuration information carrying a data forwarding path that are sent by a controller, where the data forwarding path represents a forwarding path used for data packet transmission between user equipment and a core network, the configuration information includes routing information corresponding to each node in the data forwarding path, routing information corresponding to any node in the data forwarding path includes a queue identifier allocated by the controller to a data packet, and the queue identifier is used to identify a transmission queue to which the data packet belongs; and receive a data packet from an interface connected to the core network or the user equipment, find, according to a result of matching the data packet against the filtering rule, configuration information corresponding to the data packet, add the configuration information to a header of the data packet, and forward the data packet to a next node according to routing information corresponding to the node.

Optionally, when the data forwarding path is used for the first time to forward the data packet or the data forwarding path changes, the routing information corresponding to the any node in the data forwarding path further includes:

an identifier of a node next to the any node and scheduling information of the transmission queue on the any node.

Optionally, when the any node is a last node in the data forwarding path, and the data packet is uplink data sent by the user equipment to the core network, an identifier of a node next to the last node is a bearer identifier of the core network; or when the any node is a last node in the data forwarding path, and the data packet is downlink data sent by the core network to the user equipment, an identifier of a node next to the last node is an air interface bearer identifier of the user equipment.

Optionally, that the processor 51 is configured to execute the computer code, so as to forward the data packet to the next node according to the routing information corresponding to node specifically includes:

determining the transmission queue of the data packet according to the queue identifier in the routing information that is corresponding to the node and that is in the configuration information of the header of the data packet, and forwarding the data packet to the next node according to the scheduling information of the transmission queue on the node and the identifier that is of the next node and that is in the routing information corresponding to the node.

Optionally, the scheduling information of the transmission queue on the any node includes:

priority information allocated by the controller to the transmission queue on the any node; or corresponding quality of service information allocated by the controller to the transmission queue, where the any node determines priority information of the transmission queue on the any node according to the quality of service information.

According to the node provided in this embodiment of the present disclosure, the node receives a data packet filtering rule and configuration information carrying a data forwarding path that are sent by a controller, where the data forwarding path represents a forwarding path used for data packet transmission between user equipment and a core network, configuration information includes routing information corresponding to each node in the data forwarding path, routing information corresponding to any node in the data forwarding path includes a queue identifier allocated by the controller to a data packet, and the queue identifier is used to identify a transmission queue to which the data packet belongs; and the node receives a data packet from an interface connected to the core network or the user equipment, finds, according to a result of matching the data packet against the filtering rule, configuration information corresponding to the data packet, adds the configuration information to a header of the data packet, and forwards the data packet to a next node according to the routing information corresponding to the node. The controller needs to send control signaling only to the first node in the data forwarding path by using an air interface, and control signaling sent by using the air interface is reduced, so that bandwidth utilization of the air interface is improved.

Figure 11:
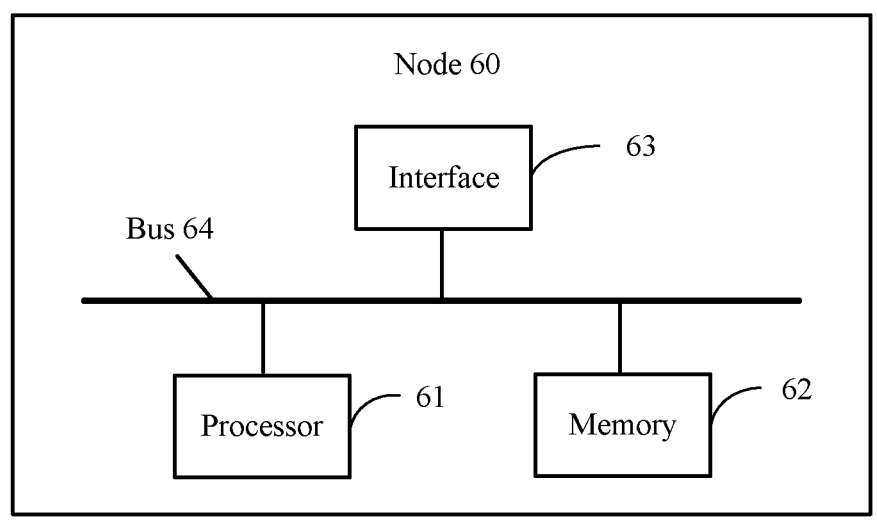
FIG. 11 is schematic structural diagram 2 of another node according to an embodiment of the present disclosure.

An embodiment of the present disclosure provides a node 60. As shown in FIG. 11, the node 60 is a node, except a first node, in a data forwarding path, and the node 60 includes: a bus 64, and a processor 61, a memory 62, and an interface 63 that are connected to the bus 64. The interface 63 is configured to perform communication. The memory 62 is configured to store computer code. The processor 61 is configured to execute the computer code, so as to:

receive, from an interface connected to a previous node, a data packet forwarded by the previous node, where a header of the data packet includes configuration information carrying a data forwarding path, the configuration information includes routing information corresponding to the node, the routing information corresponding to the node includes a queue identifier allocated by a controller to the data packet, and the queue identifier is used to identify a transmission queue to which the data packet belongs;

obtain the queue identifier of the data packet from the routing information corresponding to the node, and buffer the data packet into the transmission queue according to the queue identifier; and forward the data packet to a next node according to an identifier that is of the next node and that is stored by the node and according to scheduling information of the transmission queue on the node.

Optionally, the processor 61 is further configured to execute the computer code, so as to:

when the data forwarding path is used for the first time to forward the data packet or the data forwarding path changes, obtain, from the routing information that is corresponding to the node and that is in the configuration information, the queue identifier of the data packet, the identifier of the node next to the node, and the scheduling information of the transmission queue on the node;

buffer the data packet into the transmission queue according to the queue identifier; and forward the data packet to the next node according to the identifier of the next node and the scheduling information of the transmission queue on the node, and store the identifier of the next node and the scheduling information of the transmission queue on the node.

Optionally, the scheduling information of the transmission queue on the node includes:

priority information allocated by the controller to the transmission queue on the node; or corresponding quality of service information allocated by the controller to the transmission queue, where the node determines priority information of the transmission queue on the node according to the quality of service information.

According to the node provided in this embodiment of the present disclosure, the node receives, from an interface connected to a previous node, a data packet forwarded by the previous node, where a header of the data packet includes configuration information carrying a data forwarding path, the configuration information includes routing information corresponding to each node in the data forwarding path, routing information corresponding to any node in the data forwarding path includes a queue identifier allocated by a controller to the data packet, and the queue identifier is used to identify a transmission queue to which the data packet belongs; the node obtains the queue identifier of the data packet from the routing information corresponding to the node, and buffers the data packet into the transmission queue according to the queue identifier; and the node forwards the data packet to a next node according to an identifier that is of the next node and that is stored by the node and according to scheduling information of the transmission queue on the node. An intermediate processing node, except a first node, in the data forwarding path obtains, from the node, related information required for forwarding the data packet. In this way, the controller may implement data packet forwarding by sending control signaling only to the first node in the data forwarding path by using an air interface, and control signaling sent by using the air interface is reduced, so that bandwidth utilization of the air interface is improved.

In the several embodiments provided in the present disclosure, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software function unit.

When the foregoing integrated unit is implemented in a form of a software function unit, the integrated unit may be stored in a computer-readable storage medium. The software function unit is stored in a storage medium and includes several instructions for instructing a computer device (which may be a personal computer, a server, or a network device) or a processor to perform a part of the steps of the methods described in the embodiments of the present disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A data processing method comprising:
   determining, by a controller, a data forwarding path used for data packet transmission between user equipment and a core network;
   sending, by the controller, a data packet filtering rule and configuration information carrying the data forwarding path to a first node in the data forwarding path, wherein:
   the filtering rule is used to match configuration information corresponding to a data packet of the first node,
   the configuration information comprises routing information corresponding to each node in the data forwarding path,
   routing information corresponding to any node in the data forwarding path comprises a queue identifier allocated by the controller to the data packet,
   the queue identifier is used to identify a transmission queue to which the data packet belongs,
   when the data forwarding path is used for the first time to forward the data packet or the data forwarding path changes, the routing information corresponding to the any node in the data forwarding path further comprises an identifier of a node next to the any node, and
   when the any node is a last node in the data forwarding path, and the data packet is uplink data sent by the user equipment to the core network, the identifier of a node next to the last node is a bearer identifier of the core network.

2. The method according to claim 1, wherein when the data forwarding path is used for the first time to forward the data packet or the data forwarding path changes, the routing information corresponding to the any node in the data forwarding path further comprises scheduling information of the transmission queue on the any node.

3. The method according to claim 2, wherein when the any node is the last node in the data forwarding path, and the data packet is downlink data sent by the core network to the user equipment, the identifier of the node next to the last node is an air interface bearer identifier of the user equipment.

4. The method according to claim 2, wherein the scheduling information of the transmission queue on the any node comprises:
   priority information allocated by the controller to the transmission queue on the any node; or
   corresponding quality of service information allocated by the controller to the transmission queue, where the any node determines priority information of the transmission queue on the any node according to the quality of service information.

5. The method according to claim 2, wherein the scheduling information of the transmission queue on the any node comprises:
   corresponding quality of service information allocated by the controller to the transmission queue, wherein the any node determines priority information of the transmission queue on the any node according to the quality of service information.

6. A data processing method comprising:
   receiving, by a node, a data packet filtering rule and configuration information carrying a data forwarding path that are sent by a controller, wherein:
   the data forwarding path represents a forwarding path used for data packet transmission between user equipment and a core network,
   the configuration information comprises routing information corresponding to each node in the data forwarding path,
   routing information corresponding to any node in the data forwarding path comprises a queue identifier allocated by the controller to a data packet, and
   the queue identifier is used to identify a transmission queue to which the data packet belongs;
   receiving, by the node, the data packet from an interface connected to the core network or the user equipment;
   finding, according to a result of matching the data packet against the filtering rule, the configuration information corresponding to the data packet;
   adding the configuration information to a header of the data packet; and
   forwarding the data packet to a next node according to routing information corresponding to the node, wherein
   when the data forwarding path is used for the first time to forward the data packet or the data forwarding path changes, the routing information corresponding to the any node in the data forwarding path further comprises an identifier of a node next to the any node, and
   when the any node is a last node in the data forwarding path, and the data packet is uplink data sent by the user equipment to the core network, the identifier of a node next to the last node is a bearer identifier of the core network.

7. The method according to claim 6, wherein when the data forwarding path is used for the first time to forward the data packet or the data forwarding path changes, the routing information corresponding to the any node in the data forwarding path further comprises scheduling information of the transmission queue on the any node.

8. The method according to claim 7, wherein when the any node is the last node in the data forwarding path, and the data packet is downlink data sent by the core network to the user equipment, the identifier of the node next to the last node is an air interface bearer identifier of the user equipment.

9. The method according to claim 7, wherein forwarding, by the node, the data packet to a next node according to routing information corresponding to the node comprises:
determining, by the node, the transmission queue of the data packet according to the queue identifier in the routing information that is corresponding to the node and that is in the configuration information of the header of the data packet; and
forwarding the data packet to the next node according to the scheduling information of the transmission queue on the node and the identifier that is of the next node and that is in the routing information corresponding to the node.

10. The method according to claim 7, wherein the scheduling information of the transmission queue on the any node comprises:
priority information allocated by the controller to the transmission queue on the any node; or
corresponding quality of service information allocated by the controller to the transmission queue, where the any node determines priority information of the transmission queue on the any node according to the quality of service information.

11. The method according to claim 7, wherein the scheduling information of the transmission queue on the any node comprises:
corresponding quality of service information allocated by the controller to the transmission queue, wherein the any node determines priority information of the transmission queue on the any node according to the quality of service information.

12. A data processing method comprising:
receiving, by a node, from an interface connected to a previous node, a data packet forwarded by the previous node, wherein,
a header of the data packet comprises configuration information carrying a data forwarding path, the node is a node, except a first node, in the data forwarding path,
the configuration information comprises routing information corresponding to the node,
the routing information corresponding to the node comprises a queue identifier allocated by the controller to the data packet, and
the queue identifier is used to identify a transmission queue to which the data packet belongs;
obtaining, by the node, the queue identifier of the data packet from the routing information corresponding to the node;
buffering the data packet into the transmission queue according to the queue identifier; and
forwarding, by the node, the data packet to a next node according to an identifier that is of the next node and that is stored by the node and according to scheduling information of the transmission queue on the node, wherein
when the data forwarding path is used for the first time to forward the data packet or the data forwarding path changes, the routing information corresponding to the any node in the data forwarding path further comprises an identifier of a node next to the any node, and
when the any node is a last node in the data forwarding path, and the data packet is uplink data sent by the user equipment to the core network, the identifier of a node next to the last node is a bearer identifier of the core network.

13. The method according to claim 12, further comprising:
when the data forwarding path is used for the first time to forward the data packet or the data forwarding path changes, obtaining, by the node from the routing information that is corresponding to the node and that is in the configuration information:
the queue identifier of the data packet, and
the scheduling information of the transmission queue on the node;
buffering, by the node, the data packet into the transmission queue according to the queue identifier;
forwarding, by the node, the data packet to the next node according to the identifier of the next node and the scheduling information of the transmission queue on the node; and
storing the identifier of the next node and the scheduling information of the transmission queue on the node.

14. The method according to claim 12, wherein the scheduling information of the transmission queue on the node comprises: priority information allocated by the controller to the transmission queue on the node; or
corresponding quality of service information allocated by the controller to the transmission queue, where the any node determines priority information of the transmission queue on the any node according to the quality of service information.

15. The method according to claim 12, wherein the scheduling information of the transmission queue on the node comprises:
corresponding quality of service information allocated by the controller to the transmission queue, wherein the node determines priority information of the transmission queue on the node according to the quality of service information.

16. A node comprising:
a communications interface configured to communicate with a network element;
a processor and memory coupled to the processor, the memory comprising instructions that, when executed by the processor, cause the node to:
receive, via the communications interface, a data packet filtering rule and configuration information carrying a data forwarding path that are sent by a controller, wherein,
the data forwarding path represents a forwarding path used for data packet transmission between user equipment and a core network,
the configuration information comprises routing information corresponding to each node in the data forwarding path, routing information corresponding to any node in the data forwarding path comprises a queue identifier allocated by the controller to a data packet, and the queue identifier is used to identify a transmission queue to which the data packet belongs;

receive, via the communications interface, the data packet from an interface connected to the core network or the user equipment;

find, according to a result of matching the data packet against the filtering rule, the configuration information corresponding to the data packet;

add the configuration information to a header of the data packet; and forward the data packet to a next node according to routing information corresponding to the node, wherein when the data forwarding path is used for the first time to forward the data packet or the data forwarding path changes, the routing information corresponding to the any node in the data forwarding path further comprises an identifier of a node next to the any node, and when the any node is a last node in the data forwarding path, and the data packet is uplink data sent by the user equipment to the core network, the identifier of a node next to the last node is a bearer identifier of the core network.

17. The node according to claim 16, wherein when the data forwarding path is used for the first time to forward the data packet or the data forwarding path changes, the routing information corresponding to the any node in the data forwarding path further comprises scheduling information of the transmission queue on the any node.

18. The node according to claim 17, wherein when the any node is a last node in the data forwarding path, and the data packet is downlink data sent by the core network to the user equipment, the identifier of the node next to the last node is an air interface bearer identifier of the user equipment.

19. The node according to claim 17, wherein the memory further comprises instructions that, when executed by the processor, cause the node to:

determine the transmission queue of the data packet according to the queue identifier in the routing information that is corresponding to the node and that is in the configuration information of the header of the data packet; and forward, via the communications interface, the data packet to the next node according to the scheduling information of the transmission queue on the node and the identifier that is of the next node and that is in the routing information corresponding to the node.

20. The node according to claim 17, wherein the scheduling information of the transmission queue on the any node comprises:

priority information allocated by the controller to the transmission queue on the any node; or corresponding quality of service information allocated by the controller to the transmission queue, where the any node determines priority information of the transmission queue on the any node according to the quality of service information.

21. The node according to claim 17, wherein the scheduling information of the transmission queue on the any node comprises:

corresponding quality of service information allocated by the controller to the transmission queue, wherein the any node determines priority information of the transmission queue on the any node according to the quality of service information.

22. A node comprising:

a communications interface configured to communicate with a network element;

a processor and memory coupled to the processor, the memory comprising instructions that, when executed by the processor, cause the node to:

receive, via the communications interface, from an interface connected to a previous node, a data packet forwarded by the previous node, wherein, a header of the data packet comprises configuration information carrying a data forwarding path, the node is a node, except a first node, in the data forwarding path, the configuration information comprises routing information corresponding to the node, when the data forwarding path is used for the first time to forward the data packet or the data forwarding path changes, the routing information corresponding to the any node in the data forwarding path further comprises an identifier of a node next to the any node, when the any node is a last node in the data forwarding path, and the data packet is uplink data sent by the user equipment to the core network, the identifier of a node next to the last node is a bearer identifier of the core network, the routing information corresponding to the node comprises a queue identifier allocated by the controller to the data packet, and the queue identifier is used to identify a transmission queue to which the data packet belongs;

obtain the queue identifier of the data packet from the routing information corresponding to the node;

buffer the data packet into the transmission queue according to the queue identifier; and forward, via the communications interface, the data packet to a next node according to an identifier that is of the next node and that is stored by the node and according to scheduling information of the transmission queue on the node.

23. The node according to claim 22, wherein the memory further comprises instructions that, when executed by the processor, cause the node to:

when the data forwarding path is used for the first time to forward the data packet or the data forwarding path changes, obtain, from the routing information that is corresponding to the node and that is in the configuration information:

the queue identifier of the data packet, the scheduling information of the transmission queue on the node;

buffer the data packet into the transmission queue according to the queue identifier;

forward, via the communications interface, the data packet to the next node according to the identifier of the next node and the scheduling information of the transmission queue on the node; and store the identifier of the next node and the scheduling information of the transmission queue on the node.

24. The node according to claim 22, wherein the scheduling information of the transmission queue on the node comprises:

priority information allocated by the controller to the transmission queue on the node; or corresponding quality of service information allocated by the controller to the transmission queue, where the any node determines priority information of the transmission queue on the any node according to the quality of service information.

25. The node according to claim 22, wherein the scheduling information of the transmission queue on the node comprises:

corresponding quality of service information allocated by the controller to the transmission queue, wherein the node determines priority information of the transmission queue on the node according to the quality of service information.

* * * * *

UNITED STATES PATENT AND TRADEMARK OFFICE
CERTIFICATE OF CORRECTION

PATENT NO. : 10,531,274 B2
APPLICATION NO. : 15/663222
DATED : January 7, 2020
INVENTOR(S) : Zhang Page 1 of 1

It is certified that error appears in the above-identified patent and that said Letters Patent is hereby corrected as shown below:

In the Claims

Claim 23, Column 28, Lines 52-53, "the queue identifier of the data packet, the scheduling information" should read -- the queue identifier of the data packet, and the scheduling information --.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*